United States Patent [19]
Goto et al.

[11] Patent Number: 5,854,983
[45] Date of Patent: Dec. 29, 1998

[54] DIGITAL CORDLESS TELEPHONE SYSTEM

[75] Inventors: Masataka Goto; Tetsuya Kato, both of Tokyo; Kazuyuki Tate, Gifu; Yoichi Ogawa, Kanagawa, all of Japan

[73] Assignees: NEC Corporation; Oki Electric Industry Co., Ltd.; Nippon Telegraph and Telephone Corporation, all of Tokyo, Japan

[21] Appl. No.: 659,399

[22] Filed: Jun. 6, 1996

[30] Foreign Application Priority Data

Jun. 7, 1995 [JP] Japan ................................ 7-139774

[51] Int. Cl.⁶ .............................................. H04M 11/00
[52] U.S. Cl. .......................... 455/462; 455/415; 455/566
[58] Field of Search ................................. 379/142, 127; 455/414, 415, 422, 435, 462, 465, 517, 566

[56] References Cited

U.S. PATENT DOCUMENTS

| | | | |
|---|---|---|---|
| 5,218,628 | 6/1993 | Ito ............................................ | 455/462 |
| 5,377,260 | 12/1994 | Long ...................................... | 379/142 |
| 5,497,414 | 3/1996 | Bartholomew .......................... | 379/201 |
| 5,517,551 | 5/1996 | Arai ........................................ | 455/566 |
| 5,644,629 | 7/1997 | Chow ..................................... | 379/142 |

FOREIGN PATENT DOCUMENTS 4248739  9/1992  Japan .

*Primary Examiner*—Paul Loomis
*Assistant Examiner*—Thuan T. Nguyen
*Attorney, Agent, or Firm*—Sughrue, Mion, Zinn, Macpeak & Seas, PLLC

[57] ABSTRACT

A controller of a base station supervises radio communication between the base station and a plurality of personal stations of which a respective one has preset functions of which a description data is stored in a registering section of the base station so that, when an arbitrary personal station is operated into an off-hook state in response to a call it has received from a call sending station, the controller reads the description data of the functions of the personal station in the off-hook state and sends the read data to the call sending station, where it is processed to display a description of the functions before sending back a message of a complete display to the base station, where the controller responds thereto for connecting the personal station in the off-hook state for a talk with the call sending station.

6 Claims, 4 Drawing Sheets

DIGITAL CORDLESS TELEPHONE SYSTEM

BACKGROUND OF THE INVENTION

The present invention relates generally to a digital cordless telephone system, and in particular, to a digital cordless telephone system in which a base station connected. to a service channel is linked by radio communications with a plurality of personal stations.

DESCRIPTION OF THE PRIOR ART

Recently it has become typical for a digital telephone to be implemented with a display for displaying thereon some id data such as a telephone number of a destination, when sending a call thereto.

It has also been proposed to implement a digital telephone with a display for displaying thereon an id data of a call sender, as a call therefrom is received by the telephone.

This implementation is detailed in the Japanese Patent Laid-Open Publication No. 4-248739, in which a digital telephone responds to a source id sent via an ISDN (Integrated Services Digital Network) channel, as it is received by the telephone together with a call from a source station, for retrieving an electronic telephone directory as a ROM (read-only memory) in a CD (compact disc) form to read therefrom id data such as a name and a residence of an underwriter associated with the source id, as they can be checked up from an associated telephone number, so that the read data are displayed on a display of the telephone.

Such the digital telephone is implemented to display id data such as a telephone number of a destination, when sending a call thereto, as well as id data such as an underwriter's name and residence of a source station, when receiving a call therefrom, thus facilitating the use.

Incidentally, a typical type of conventional digital telephone comprises a digital cordless telephone system composed of a base station as a parent apparatus connected to a service channel and a plurality of personal stations as child apparatus linked by radio waves with the base station.

As the digital cordless telephone system permits a voluntary use, the base station does not always respond to a received call. However, the personal stations are not always identical in function to the base station. Still less, a call sending station is unable to know how the individual personal stations work.

Therefore, in case of a call reception at a personal station incapable of a private talk for example, if the carrying person is different from a desired person to receive the call, it frequently so follows that the former is obliged to be responsible for a polite request from an originating person to kindly serve for going to fetch the latter or carrying about the child apparatus to hand it over to him or her.

The present invention has been achieved with such points in mind.

SUMMARY OF THE INVENTION

It therefore is an object of the present invention to provide a digital cordless telephone system permitting a list of available functions at a call receiving personal station to be displayed at a call sending end, to solve the problems described.

To achieve the object, a genus of the present invention provides a digital cordless telephone system comprising a base station connectable via a service channel with a call sending station, and a plurality of personal stations of which a respective one is linked by radio waves with the base station and responsible for a call it has received from the call sending station to be controllabe in an off-hook state thereof for a talkable connection therewith, the respective personal station having a corresponding function preset thereto, wherein the base station includes a first means for storing therein a first data on a description of the corresponding function of the respective personal station, a second means responsive to the off-hook state of an arbitrary one of the plurality of personal stations for reading the first data on the description of the corresponding function thereof from the first means to send the read data as a second data to the call sending station, which is responsive to the second data to display the description of the corresponding function of the arbitrary personal station before sending back a third data representative of a complete display of the same, and a third means responsive to the third data for controlling the arbitrary personal station in the off-hook state so that the talkable connection is established between the arbitrary personal station and the call sending station.

In a digital cordless telephone system according to the genus of the invention, a base station includes a first means as a storage means for storing therein a data on a description of a preset function such as a private communication function of each personal station that is linked by radio waves with the base sation, so that the storage means may have registered in advance whole or part of data on the respective functions of all linked personal stations.

The base station may have a radio section operative for radio communications with the personal stations. The base station is connectable via a service channel with a call sending station. Each personal station is responsible for a call it has received from the call sending station, to be controllabe in an off-hook state thereof for a talkable connection therewith.

Moreover, the base station includes a second means as part of a control section thereof cooperative with the radio section, to be responsive to the off-hook state of a concerned personal station, as it has received the call, for reading the stored data of the function of the concerned personal station from the first means to send the read data as a second data via the service channel to the call sending station.

The call sending station which may comprise an identical digital cordless telephone system is responsive to the second data to display the description of the function of the concerned personal station before sending back via the service channel to the base station a third data representative of a complete display of the same.

Further, the base station includes a third means as part of the control section cooperative with the radio section, to be responsive to the third data for controlling the concerned personal station in the off-hook state so that the,talkable connection is established between the concerned personal station and the call sending station.

As a result, an operator of the call sending station is permitted to know the function of the concerned personal station before a talk therewith, so that he or she can make use of the function, if available for him or her, such as by requesting a carrying person of an apparatus of the concerned personal station for a transfer or take-over of talk to a desired person.

According to a species of the genus of the invention, the corresponding function of the respective personal station comprises a combination of individual functions, and the base station is responsive to a request from an identified one of the plurality of personal stations for one of a deletion and a registration of part of the first data stored in the first means corresponding to a description of an arbitrary one of the individual functions of the identified personal station.

According to another species of the genus of the invention, the respective personal station has stored therein the first data thereof, and the base station reads the first data from the respective personal station so that first means has registered therein the same.

According to another species of the genus of the invention, the call sending station comprises another said digital cordless telephone system having the plurality of personal stations each respectively including a display means responsive to the second data for displaying the description of the corresponding function of the arbitrary personal station.

Moreover, to achive the object, another genus of the present invention provides a digital cordless telephone system comprising a base station connectable via a service channel with a call sending station, and a plurality of personal stations of which a respective one is linked by radio waves with the base station so that it is responsible for a call received from the call sending station via the base station, to be operative into an off-hook state thereof, where it is connectable for a talk with the call sending station via the base station, the respective personal station having at least one of a talk reservation function, a private talk function and a hand-free function preset thereto to be effective in the off-hook state thereof, wherein the base station comprises a radio section for the linking with the plurality of personal stations, a registration means for storing therein a first data on a description of the one or more functions of the respective personal station, and a control means cooperative with the radio section to be responsive to the off-hook state of an arbitrary one of the plurality of personal stations for reading the first data on the description of the one or more functions of the arbitrary personal station from the registration means to send the read data as a second data to the call sending station, which is responsive to the second data to display the description of the one or more functions of the arbitrary personal station before sending back a third data representative of a complete display of the same, the control means being further cooperative with the radio section to be responsive to the third data for connecting the arbitrary personal station in the off-hook state for a talk with the call sending station via the base station and the service channel.

According to a species of this genus of the invention, the the call sending station comprises another said digital cordless telephone system having the plurality of personal stations each respectively including a display means responsive to the second data for displaying the description of the one or more functions of the arbitrary personal station.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Referring now to the accompanying drawings, description will be given of an embodiment of the digital cordless telephone system in accordance with the present invention.

Figure 1:
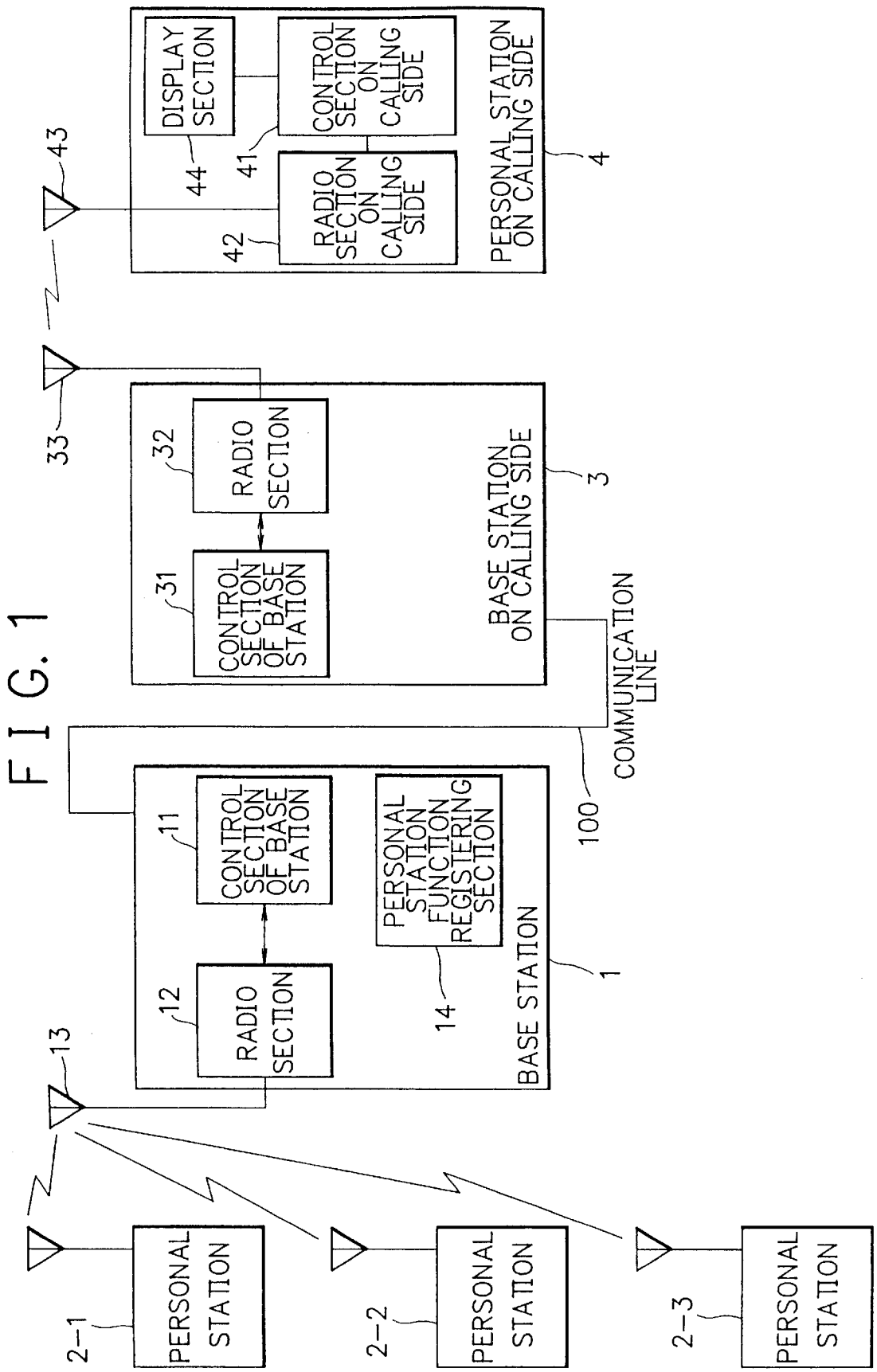
FIG. 1 is a schematic block diagram showing the construction of an embodiment of the digital cordless telephone system in accordance with the present invention.

FIG. 1 shows in a block diagram the configuration of the embodiment of the present invention. In this diagram, the system includes a base station 1 and a plurality of personal stations 2-1 to 2-3 connected via radio communication to the base station 1.

The base station 1 includes a control section 11, a radio section 12, an antenna 13, and a personal station function registering section 14. The controller 11 supervises operations of radio communication between the base station 1 and the plural personal stations 2-1 to 2-3 via the radio station 12 and antenna 13. Moreover, when each of the personal stations 2-1 to 2-3 is installed in the system, the controller 11 collects data on a description of index of the contents of functions thereof and registers a description or index data of the functions to the function registering section 14, thereby keeping the same.

In each of the personal stations 2-1 to 2-3, there is also provided a storage section, not shown, to keep therein the data on the contents of functions so as to indicate the functions beforehand set thereto. The controller 11 issues a read request to the storage section of each personal station to collect the data on the contents of functions therefrom.

Additionally, in response to a request from each of the personal stations 2-1 to 2-3, the controller 11 can partially delete functions from those registered to the registration section 14 and/or can partially add or update functions for registration thereof.

On the other hand, the digital cordless telephone system on the calling side includes a base station 3 connected via a communication line or service channel 100 to the base station 1, and a plurality of personal stations connected via radio communications to the base station 3, including a shown one 4.

The base station 3 on the calling side includes a controller 31, a radio section 32, and an antenna 33, whereas the personal station 4 on the calling side includes a controller 41, a radio section 42, an antenna 43, and a display section.

The controller 31 of the base station 3 supervises radio communication between the base station 3 and the calling personal station 4 via the radio section 32 and antenna 33. A responding personal station (2-1 for example) sends the contents of functions through the base station 1, a communication line or service channel 100 and the base station 3, to the calling personal station 4. The contents of functions sent from the base station 1 are received as an incoming call to the base station 3. On receiving the contents of functions via the radio station 42 and antenna 43, the controller 41 of the personal station 4 presents the contents of functions on the display section 44.

In this regard, since the configuration of each of the personal stations 2-1 to 2-3 is substantially the same as that of the personal station 4 on calling side, when the station 4 receives a call sent from one of the personal stations 2-1 to 2-3, contents of functions of the station 4 may be displayed on a display of the call sending station.

Namely, the set of stations at the calling side may comprise an identical digital cordless telephone system to the set of stations 1 and 2-1 to 2-3, so that the personal stations 2-1 to 2-3 may each respectively include the constitution of the station 4. Likewise, the station 4 may include a storage section for keeping data on a content of functions thereof.

Figure 2:
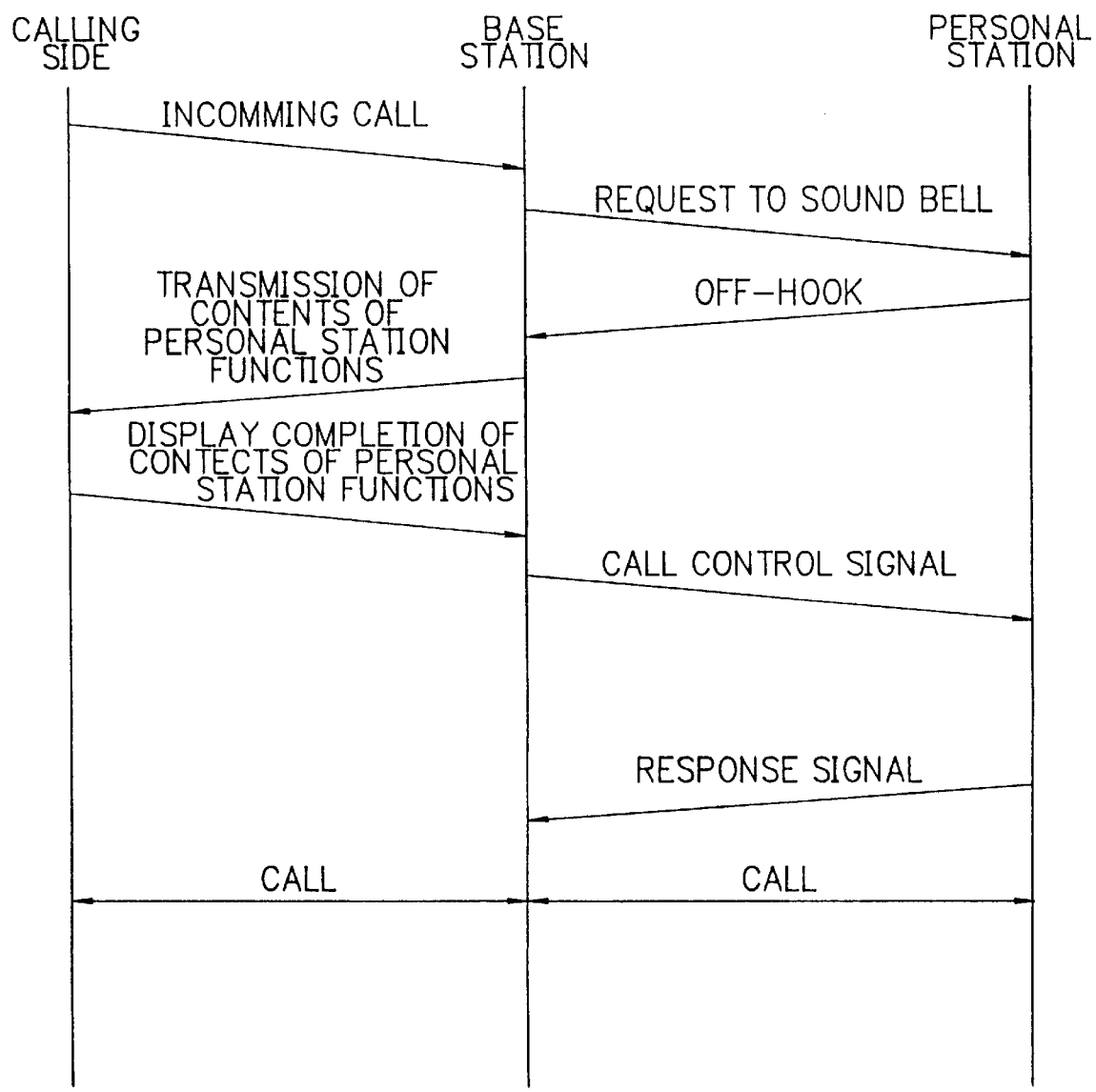
FIG. 2 is a operational sequence chart of the embodiment shown in FIG. 1.
Figure 3:
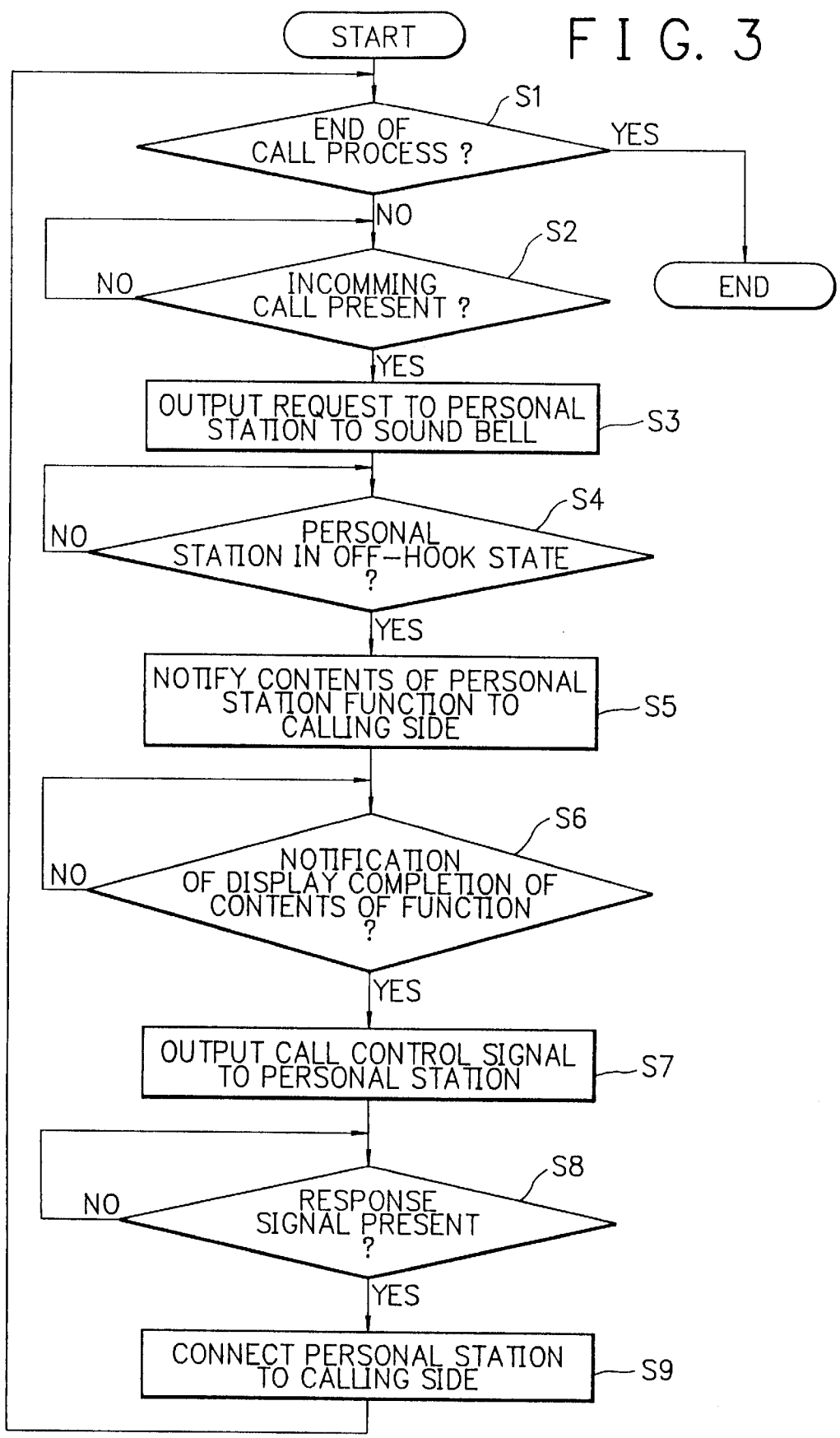
FIG. 3 is a flowchart showing operation of a control section of a base station shown in FIG. 1.

FIG. 2 is a sequence chart showing operation of the embodiment in accordance with the present invention, whereas FIG. 3 is a flowchart showing operation of the base station controller 11 of FIG. 1. Operation of the embodiment will be described by referring to FIGS. 1 to 3.

When an incoming call from the calling personal station 4 is received via the calling base station 3 and communication line 100 (step S2 of FIG. 3), the controller 11 of the base station 1 sounds a bell of the base station 1 and outputs a request via the radio section 12 and antenna 13 to the personal stations 2-1 to 2-3, causing their bells to sound (step S3 of FIG. 3).

On this occasion, if the base station 1 is operated into an off-hook state, the controller 11 connects the base station 1 to the calling personal terminal 4 to establish a talkable connection therebetween.

On the other hand, for example, if the personal station 2-1 is operated into an off-hook state (step S4 of FIG. 3), the controller of base station 11 reads the contents of functions of the station 2-1 from the registering section 14 to notify the contents via the communication line 100 and calling base station 3 to the calling personal station 4 (step S5 of FIG. 3).

On receiving the contents of functions of the personal station 2-1 via the antenna 43 and calling radio section 42, the controller 41 of the calling personal station 4 presents the contents on the display section and then sends a message of the completion of a display of the contents of functions of the personal station 2-1 via the base station 3 on the calling side 3 and communication line 100 to the base station 1.

When the message of the display completion is received from the calling personal station 4 via the base station 3 on the calling side and communication line 100 (step S6 of FIG. 3), the controller 11 of the base station 1 sends a call control signal to the personal station 2-1 (step S7 of FIG. 3).

In response to this signal, if a response signal is sent from the station 2-1 (step S8 of FIG. 3), the controller 11 connects the calling station 4 to the personal station 2-1 to establish a talkable connection therebetween (step S9 of FIG. 3; reference is to be made to FIG. 2).

In this regard, the contents of functions of personal stations 2-1 to 2-3 include, for example, a hold or reservation function, an extension call or private talk function, and a hand-free function. The contents of functions are registered to the function registering section 14 respectively in association with the personal stations 2-1 to 2-3.

Incidentally, description has been given of the processing operation of the personal station 2-1. However, the operations above can also be conducted for the personal stations 2-2 and 2-3 in substantially the same fashion.

Figure 4:
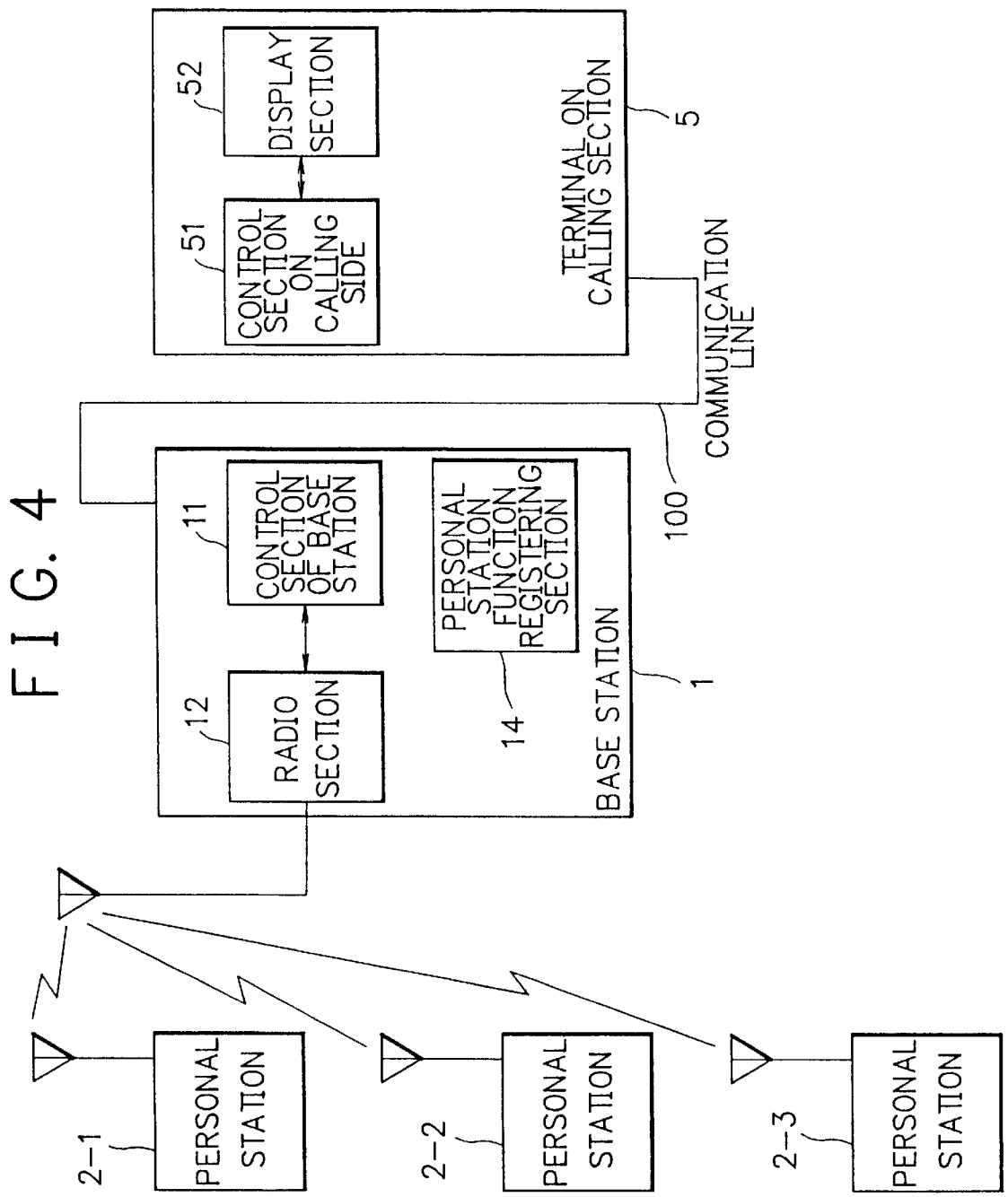
FIG. 4 is a block diagram showing structure of an alternative embodiment of the digital cordless telephone system in accordance with the present invention.

FIG. 4 shows in a block diagram the construction of an alternative embodiment of the digital cordless telephone system in accordance with the present invention. In this diagram, the configuration of the system is substantially the same as that of the first embodiment excepting that the calling side includes a terminal 5 simply connected to the communication line 100.

Moreover, in FIG. 4, the same constituent elements are assigned with the same reference numerals of the associated elements of the first embodiment and the operation of the elements are substantially the same as those of the related elements.

The terminal 5 at the calling side includes a controller 51 and a display section 52. On receiving the contents of functions of any of the personal stations 2-1 to 2-3 from the base station 1 via the communication line 100, the controller 51 presents the contents on the display section 52.

Consequently, the terminal 5 facilitates call communication with the personal stations 2-1 to 2-3 according to the contents of functions presented on the display section 52. That is, when an extension call or private talk function is disposed in personal stations 2-1 to 2-3, a transfer of the communication to another personal or base station can be immediately requested.

When the extension call or private talk function is missing in the communicating personal station 2-1, 2-2, or 2-3, the call originator can immediately ask the communicating partner to bring the telephone set to a pertinent person.

As above, the contents of functions beforehand allocated to the personal stations 2-1 to 2-3 are registered to the personal station function registering section 14 such that when any of the personal stations 2-1 to 2-3 responding to an incoming call from the personal station 4 or terminal 5 is operated into an off-hook state, the contents of functions of the responding station are read from the registering section 14 to be sent to the calling station or terminal 4 or 5.

In response to a notification of the display completion from the calling station or terminal 4 or 5, the responding personal station is connected to the calling station or terminal 4 or 5 under control of the controller 11 of the base station 1.

Due to the operation above, the contents of functions of the personal stations 2-1, 2-2, or 2-3 responding to the incoming call can be displayed on the calling station or terminal 4 or 5 before a talk is permitted therebetween, thereby enabling a smooth conversation, for example, to pass the call to a pertinent person whom the calling originator desires to talk with.

In accordance with the present invention described above, the contents of functions beforehand allocated to a plurality of personal stations are registered to a registering section such that when a respective one of the personal stations is operated into an off-hook state in response to an incoming call from a calling side, the contents of functions of the personal station are read from the registering section to be sent to the calling side.

In response to a notification of a complete display on the calling side, the personal station is connected to the calling side. This leads to an advantageous effect that the contents of functions of the personal station responding to the incoming call can be displayed on the calling side prior to initiation of a talk therebetween.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A digital cordless telephone system comprising:
   a base station connectable via a service channel with a call sending station; and
   a plurality of personal stations of which a respective one is linked by radio waves with the base station and responsible for a call it has received from the call sending station to be controllabe in an off-hook state thereof for a talkable connection therewith, the respective personal station having a corresponding function preset thereto,
   wherein the base station includes:
      a first means for storing therein a first data on a description of the corresponding function of the respective personal station;

a second means responsive to the off-hook state of an arbitrary one of the plurality of personal stations for reading the first data on the description of the corresponding function thereof from the first means to send the read data as a second data to the call sending station, which is responsive to the second data to display the description of the corresponding function of the arbitrary personal station before sending back a third data representative of a complete display of the same; and a third means responsive to the third data for controlling the arbitrary personal station in the off-hook state so that the talkable connection is established between the arbitrary personal station and the call sending station.

2. A digital cordless telephone system according to claim 1, wherein the crresponding function of the respective personal station comprises a combination of individual functions, and wherein the base station is responsive to a request from an identified one of the plurality of personal stations for one of a deletion and a registration of part of the first data stored in the first means corresponding to a description of an arbitrary one of the individual functions of the identified personal station.

3. A digital cordless telephone system according to claim 1, wherein the respective personal station has stored therein the first data thereof, and wherein the base station reads the first data from the respective personal station so that the first means has registered therein the same.

4. A digital cordless telephone system according to claim 1, wherein the call sending station comprises another said digital cordless telephone system having the plurality of personal stations each respectively including a display means responsive to the second data for displaying the description of the corresponding function of the arbitrary personal station.

5. A digital cordless telephone system comprising:

a base station connectable via a service channel with a call sending station; and a plurality of personal stations of which a respective one is linked by radio waves with the base station so that it is responsible for a call received from the call sending station via the base station, to be operative into an off-hook state thereof, where it is connectable for a talk with the call sending station via the base station, the respective personal station having at least one of a talk reservation function, a private talk function and a hand-free function preset thereto to be effective in the off-hook state thereof, wherein the base station comprises:

a radio section for the linking with the plurality of personal stations;

a registration means for storing therein a first data on a description of the one or more functions of the respective personal station; and a control means cooperative with the radio section to be responsive to the off-hook state of an arbitrary one of the plurality of personal stations for reading the first data on the description of the one or more functions of the arbitrary personal station from the registration means to send the read data as a second data to the call sending station, which is responsive to the second data to display the description of the one or more functions of the arbitrary personal station before sending back a third data representative of a complete display of the same, the control means being further cooperative with the radio section to be responsive to the third data for connecting the arbitrary personal station in the off-hook state for a talk with the call sending station via the base station and the service channel.

6. A digital cordless telephone system according to claim 5, wherein the call sending station comprises another said digital cordless telephone system having the plurality of personal stations each respectively including a display means responsive to the second data for displaying the description of the one or more functions of the arbitrary personal station.

* * * * *